(12) United States Patent
Fattal

(10) Patent No.: US 11,314,099 B2
(45) Date of Patent: Apr. 26, 2022

(54) TRANSPARENT DISPLAY AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 422 days.

(21) Appl. No.: 16/371,072

(22) Filed: Mar. 31, 2019

(65) Prior Publication Data
US 2019/0227335 A1    Jul. 25, 2019

Related U.S. Application Data

(63) Continuation of application No. PCT/US2017/055178, filed on Oct. 4, 2017.
(Continued)

(51) Int. Cl.
*G02B 5/18* (2006.01)
*G02B 27/42* (2006.01)
(Continued)

(52) U.S. Cl.
CPC ......... *G02B 27/425* (2013.01); *G02B 5/1819* (2013.01); *G02B 6/0036* (2013.01);
(Continued)

(58) Field of Classification Search
CPC .. G02B 27/425; G02B 6/0038; G02B 5/1819; G02B 6/0036; G02B 30/33; G02F 1/133504; G02F 1/133606
(Continued)

(56) References Cited

U.S. PATENT DOCUMENTS 5,751,388 A * 5/1998 Larson .................. G02B 3/005
349/96
9,128,226 B2 9/2015 Fattal et al.
(Continued)

FOREIGN PATENT DOCUMENTS

JP     2012226199 A    11/2012
WO    2012038856 A1    3/2012
(Continued)

OTHER PUBLICATIONS

International Search Report and Written Opinion (ISRWO) by International Searching Authority (ISA) Korean Intellectual Property Office (KIPO), dated Jan. 19, 2018 (14 pages) for counterpart PCT Application No. PCT/US2017/055178.
(Continued)

*Primary Examiner* — Audrey Y Chang
(74) *Attorney, Agent, or Firm* — J. Michael Johnson

(57) ABSTRACT

A transparent display and a transparent multiview display an image while enabling a background scene to be visible through the display. The transparent display includes a light guide having a scattering feature and an array of light valves configured to modulate emitted light scattered from the light guide to provide modulated emitted light representing a displayed image. Transparency of a combination of the light guide and the array of light valves is configured to enable the background scene to be visible through the transparent display. The transparent multiview display includes the light guide and a plurality of multibeam elements configured to scatter guided light from the light guide as a plurality of directional light beam. The transparent multiview display further includes an array of light valves to modulate the directional light beams to provide the display image as a multiview image.

19 Claims, 10 Drawing Sheets

Related U.S. Application Data

(60) Provisional application No. 62/404,747, filed on Oct. 5, 2016.

(51) Int. Cl.
    *F21V 8/00*           (2006.01)
    *G02B 30/33*         (2020.01)
    *G02F 1/1335*       (2006.01)
    *G02F 1/13357*      (2006.01)
    *G02F 1/167*         (2019.01)

(52) U.S. Cl.
    CPC ........... *G02B 6/0038* (2013.01); *G02B 30/33* (2020.01); *G02F 1/133504* (2013.01); *G02F 1/133606* (2013.01); *G02F 1/167* (2013.01)

(58) Field of Classification Search
    USPC .............. 362/606, 613; 349/96; 359/569, 34
    See application file for complete search history.

(56) References Cited

U.S. PATENT DOCUMENTS

| | | |
|---|---|---|
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 2004/0070711 A1 | 4/2004 | Wen et al. |
| 2006/0291240 A1 | 12/2006 | Kim et al. |
| 2010/0026930 A1 | 2/2010 | Jepsen |
| 2010/0245321 A1 | 9/2010 | Ogita et al. |
| 2011/0013123 A1 | 1/2011 | Park et al. |
| 2011/0122467 A1 | 5/2011 | Futterer et al. |
| 2011/0141395 A1 | 6/2011 | Yashiro |
| 2012/0008067 A1 | 1/2012 | Mun et al. |
| 2012/0127751 A1 | 5/2012 | Kimmel |
| 2012/0163021 A1 | 6/2012 | Bohn et al. |
| 2012/0195072 A1* | 8/2012 | Minami ................ G02F 1/1336 362/613 |
| 2012/0212486 A1 | 8/2012 | Van Der Horst et al. |
| 2013/0069933 A1 | 3/2013 | Smithwick et al. |
| 2013/0082980 A1 | 4/2013 | Gruhlke et al. |
| 2013/0329301 A1 | 12/2013 | Travis |
| 2014/0118336 A1 | 5/2014 | Smithwick |
| 2014/0268867 A1 | 9/2014 | Fiorentino et al. |
| 2015/0003106 A1 | 1/2015 | Thompson et al. |
| 2015/0355403 A1* | 12/2015 | Santori ................ G02B 6/0058 362/606 |
| 2016/0195664 A1 | 7/2016 | Fattal et al. |
| 2016/0320620 A1 | 11/2016 | Maimone |
| 2017/0090096 A1 | 3/2017 | Fattal |
| 2017/0363794 A1* | 12/2017 | Wan ..................... G02B 6/0025 |
| 2018/0011237 A1 | 1/2018 | Fattal |
| 2018/0299608 A1 | 10/2018 | Fattal et al. |

FOREIGN PATENT DOCUMENTS

| | | |
|---|---|---|
| WO | 2016111706 A1 | 7/2016 |
| WO | 2017204840 A1 | 11/2017 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Chun-Wei Liu, et al., Sub-wavelength gratings fabricated on a light bar by roll-to-roll UV embossing process, Optics Express, Jun. 6, 2011, pp. 11299-11311, vol. 19, No. 12.

\* cited by examiner

TRANSPARENT DISPLAY AND METHOD

CROSS-REFERENCE TO RELATED APPLICATIONS

This application is a continuation patent application of and claims the benefit of priority to International Application No. PCT/US2017/055178, filed Oct. 4, 2017, which claims the benefit of priority to U.S. Provisional Patent Application Ser. No. 62/404,747, filed Oct. 5, 2016, each of which is incorporated by reference herein in its entirety.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a transparent display that enables viewing a background scene through the transparent display. In particular, some embodiments consistent with the principles described herein provide a transparent display employing a light guide having angle-preserving scattering as a backlight to illuminate the transparent display. In some embodiments, the angle-preserving scattering provides directional light beams to produce a multiview image and the transparent display is a transparent multiview display. In particular, the multibeam elements used in angle-preserving scattering are configured to provide directional light beams having a plurality of different principal angular directions by scattering light guided in a light guide of the backlight. According to various embodiments, the different principal angular directions of the light beams provided by the multibeam elements of the transparent multiview display correspond to different directions of various different views of the multiview image. Uses of the transparent displays described herein include various display applications such as, but not limited to, augmented reality displays.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image.

Figure 1A:
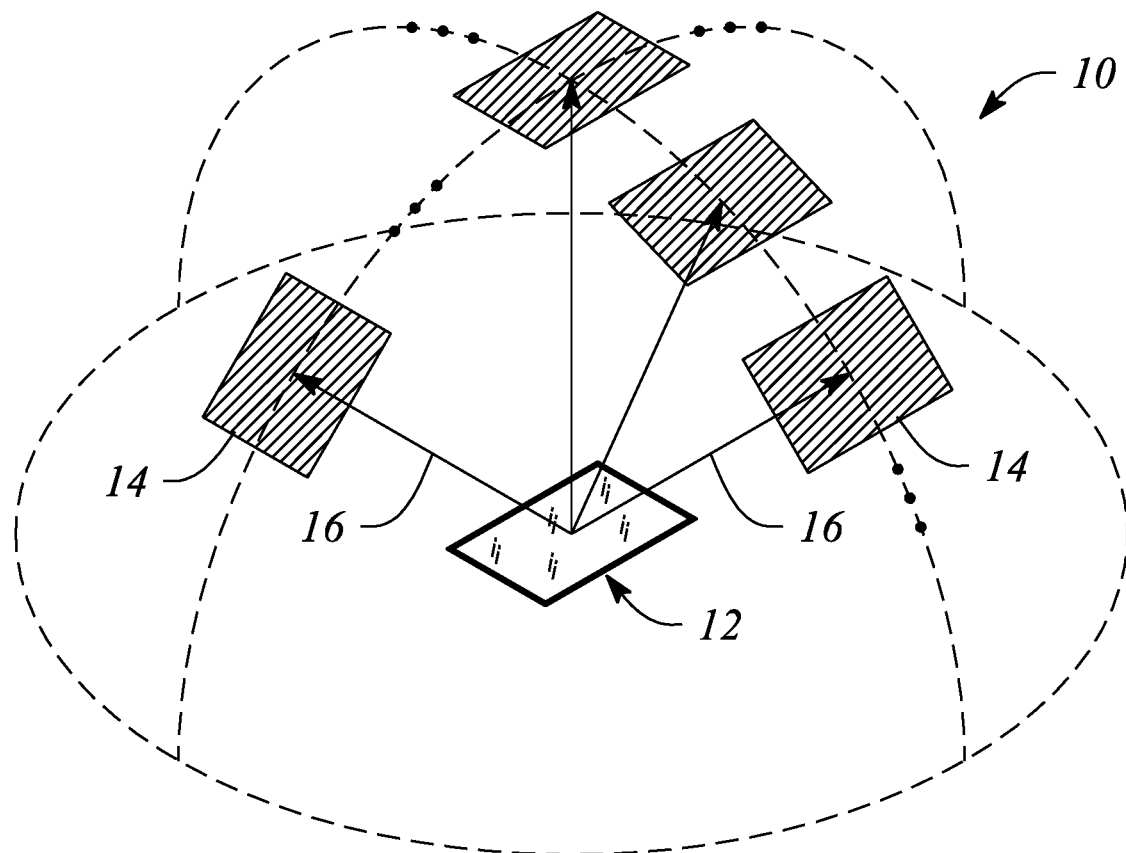
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
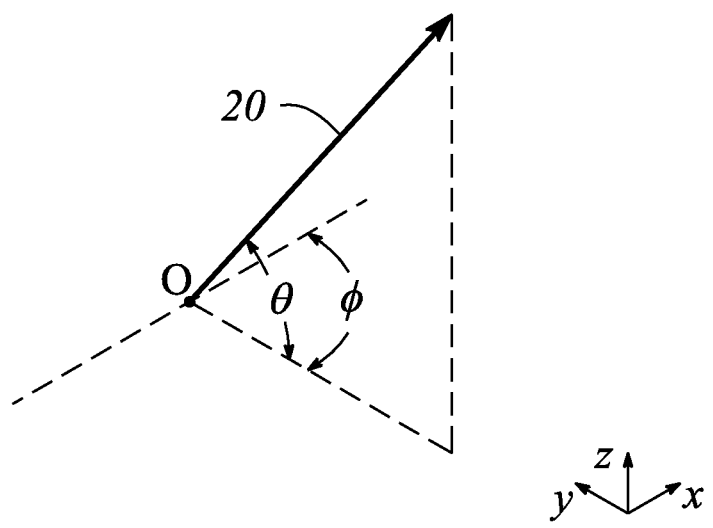
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction or simply 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have an individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

In some embodiments, a number of view pixels in a multiview pixel may be equal to a number of views of the multiview display. For example, the multiview pixel may provide sixty-four (64) view pixels in associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam direction) that corresponds to a different one of the view directions corresponding to the 64 different views, for example. Further, according to some embodiments, a number of multiview pixels of the multiview display may be substantially equal to a number of pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'polarization-preserving scattering feature' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering feature' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
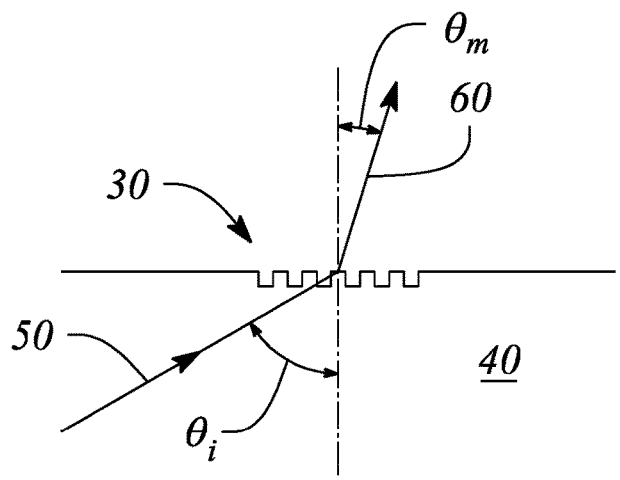
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 may be a beam of guided light (i.e., a guided light beam) within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example diffraction order m=1 (i.e., a first diffraction order).

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality, by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/-$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
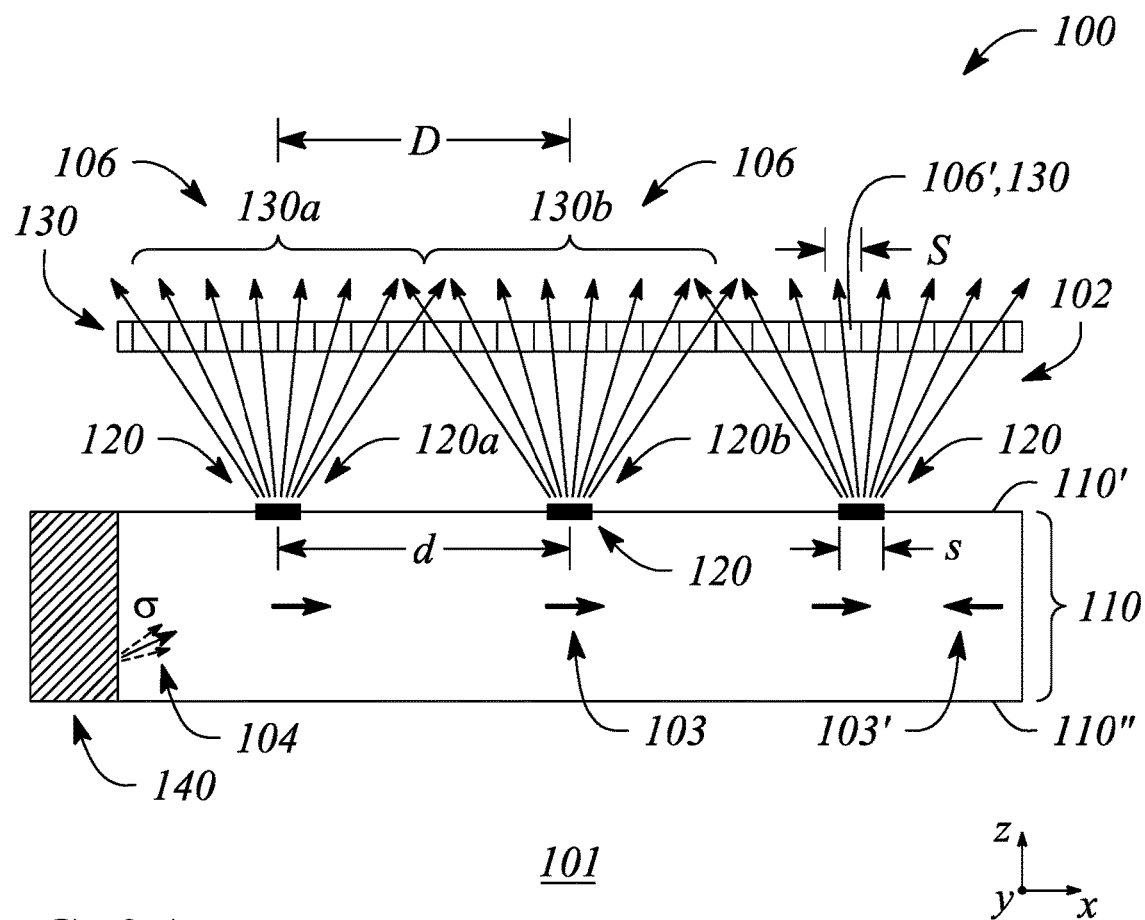
FIG. 3A illustrates a cross sectional view of a transparent multiview display in an example, according to an embodiment consistent with the principles described herein.
Figure 3B:
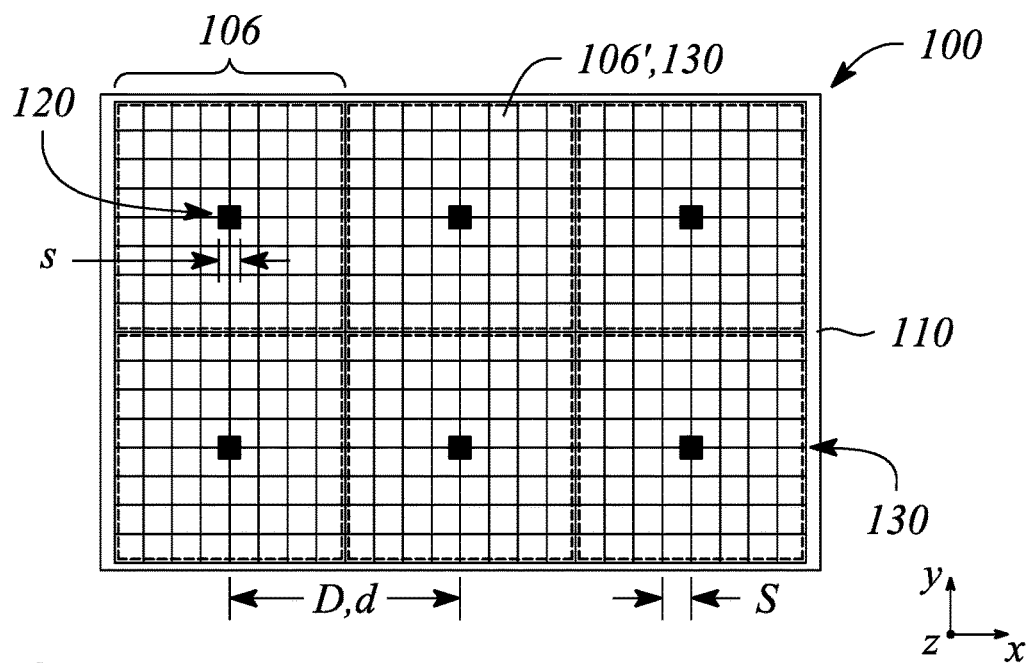
FIG. 3B illustrates a plan view of a transparent multiview display in an example, according to an embodiment consistent with the principles described herein.
Figure 3C:
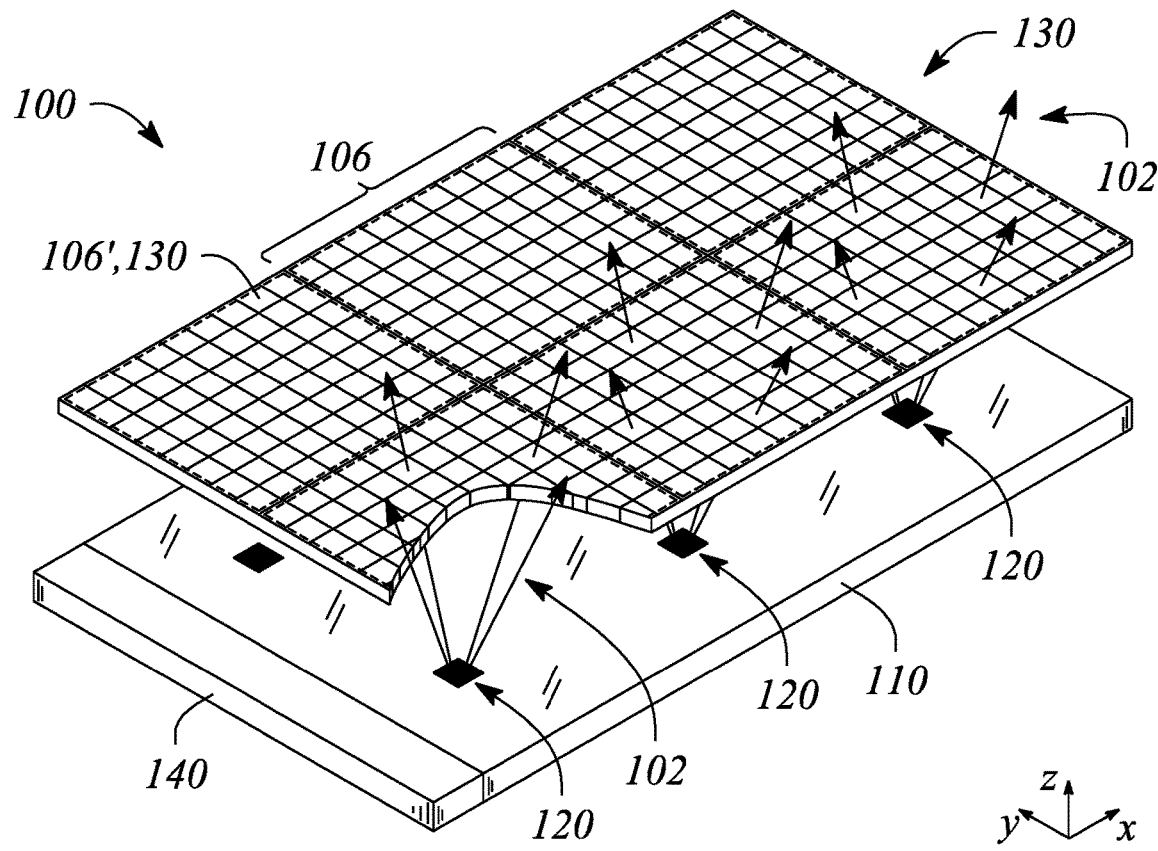
FIG. 3C illustrates a perspective view of a transparent multiview display in an example, according to an embodiment consistent with the principles described herein.
Figure 3D:
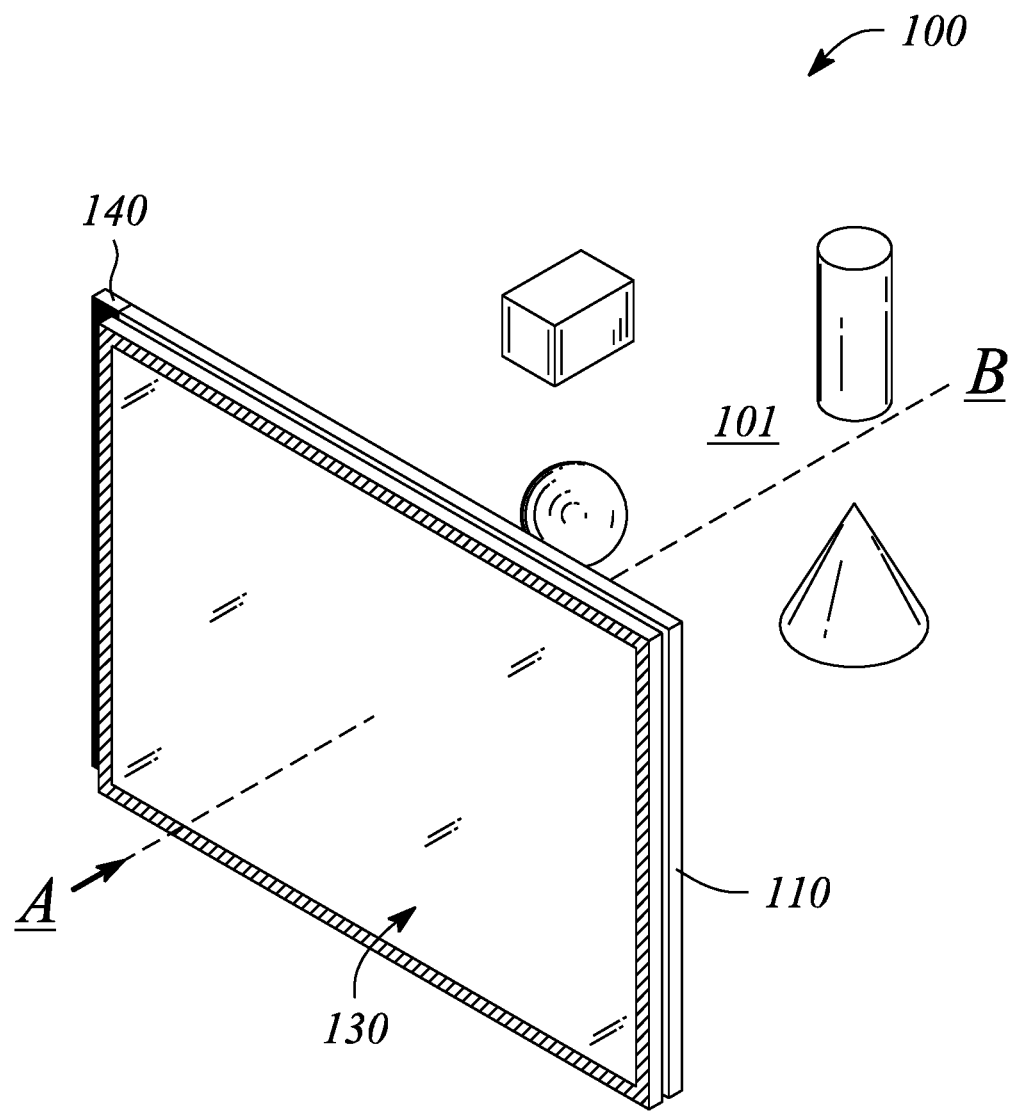
FIG. 3D illustrates another perspective view of a transparent multiview display in an example, according to an embodiment consistent with the principles described herein.
Figure 3D:
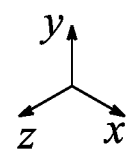

According to some embodiments of the principles described herein, a transparent multiview display is provided. FIG. 3A illustrates a cross sectional view of a transparent multiview display 100 in an example, according to an embodiment consistent with the principles described herein. FIG. 3B illustrates a plan view of a transparent multiview display 100 in an example, according to an embodiment consistent with the principles described herein. FIG. 3C illustrates a perspective view of a transparent multiview display 100 in an example, according to an embodiment consistent with the principles described herein. FIG. 3D illustrates another perspective view of a transparent multiview display 100 in an example, according to an embodiment consistent with the principles described herein. The perspective view in FIG. 3C is illustrated with a partial cut-away to facilitate discussion herein only.

The transparent multiview display 100 illustrated in FIGS. 3A-3D is configured to provide a plurality of coupled-out or scattered-out directional light beams 102 having different principal angular directions from one another (e.g., as a light field). In particular, the provided plurality of directional light beams 102 are directed away from the transparent multiview display 100 in different principal angular directions corresponding to respective view directions of a multiview image, according to various embodiments. Further, the directional light beams 102 are modulated (e.g., using light valves, as described below) to provide or display the multiview image on or by the transparent multiview display 100. In some embodiments, the multiview image may include three-dimensional (3D) content (e.g., virtual objects represented in different perspective views that appear as 3D objects when viewed by a user).

Further, as illustrated in FIG. 3D, the transparent multiview display 100 is configured to enable a background scene 101 to be visible through the transparent multiview display 100. That is, the transparent multiview display 100 may enable a user to simultaneously view both the displayed multiview image and the background scene 101. Moreover, the displayed multiview image may be provided or may appear the user as being superimposed on or 'in' the background scene 101, when the background scene 101 is viewed through the transparent multiview display 100. Thus, the transparent multiview display 100 may provide an augmented reality (AR) experience to the user in which 3D virtual objects appear to be in the background scene 101, according to some embodiments. As illustrated in FIG. 3D, the user may view the transparent multiview display 100 from a position or region A and the background scene 101 may be located on an opposite side of the transparent multiview display 100 from that of position A, e.g., region B. For example, the user may view a front side of the transparent multiview display 100 from region A in a direction indicated by a bold arrow and dashed line, while the background scene is located behind the transparent multiview display 100 in region B.

As illustrated in FIGS. 3A-3D, the transparent multiview display 100 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In particular, the light guide 110 may be a slab or plate optical waveguide comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle. In some embodiments, the guided light 104 comprises a plurality of guided light beams of different colors of light. The light beams of the plurality of guided light beams may be guided by the light guide 110 at respective ones of different color-specific, non-zero propagation angles. Note that the non-zero propagation angle is not illustrated for simplicity of illustration. However, a bold arrow depicting a propagation direction 103 illustrates a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or coupled into the light guide 110 at the non-zero propagation angle (e.g., about 30-35 degrees). One or more of a lens, a mirror or similar reflector (e.g., a tilted collimating reflector), a diffraction grating, and a prism (not illustrated) may facilitate coupling light into an input end of the light guide 110 as the guided light 104 at the non-zero propagation angle, for example. Once coupled into the light guide 110, the guided light 104 propagates along the light guide 110 in a direction that may be generally away from the input end (e.g., illustrated by bold arrows pointing along an x-axis in FIG. 3A).

Further, the guided light 104 or equivalently the guided light 104 produced by coupling light into the light guide 110 may be a collimated light beam, according to various embodiments. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, the transparent multiview display 100 may include a collimator, such as, but not limited to, a lens, reflector or mirror, a diffraction grating, or a tapered light guide, configured to collimate the light, e.g., from a light source. In some embodiments, the light source comprises a collimator. The collimated light provided to the light guide 110 is a collimated guided light 104. The guided light 104 may be collimated according to or having a collimation factor σ, in various embodiments.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. Recycling guided light 104 in this manner may increase a brightness of the transparent multiview display 100 (e.g., an intensity of the directional light beams 102) by making guided light available more than once, for example, to multibeam elements, described below.

In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103).

As illustrated in FIGS. 3A-3C, the transparent multiview display 100 further comprises a plurality of multibeam elements 120 spaced apart from one another along the light guide length. In particular, the multibeam elements 120 of the plurality are separated from one another by a finite space and represent individual, distinct elements along the light guide length. That is, by definition herein, the multibeam elements 120 of the plurality are spaced apart from one another according to a finite (i.e., non-zero) inter-element distance (e.g., a finite center-to-center distance). Further the multibeam elements 120 of the plurality generally do not intersect, overlap or otherwise touch one another, according to some embodiments. That is, each multibeam element 120 of the plurality is generally distinct and separated from other ones of the multibeam elements 120.

According to some embodiments, the multibeam elements 120 of the plurality may be arranged in either a one-dimensional (1D) array or two-dimensional (2D) array. For example, the plurality of multibeam elements 120 may be arranged as a linear 1D array. In another example, the plurality of multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 120 may be substantially uniform or constant across the array. In other examples, the inter-element distance between the multibeam elements 120 may be varied one or both of across the array and along the length of the light guide 110.

According to various embodiments, a multibeam element 120 of the plurality is configured to couple or scatter out a portion of the guided light 104 as the plurality of directional light beams 102. In particular, FIGS. 3A and 3C illustrate the directional light beams 102 as a plurality of diverging arrows depicted as being directed way from the first (or front) surface 110' of the light guide 110. Further, a size of the multibeam element 120 is comparable to a size of a view pixel 106' (or equivalently a size of a light valve 130, described below) in a multiview pixel 106, of the transparent multiview display 100, according to various embodiments.

Herein, the 'size' may be defined in any of a variety of manners to include, but not be limited to, a length, a width or an area. For example, the size of a view pixel 106' may be a length thereof and the comparable size of the multibeam element 120 may also be a length of the multibeam element 120. In another example, size may refer to an area such that an area of the multibeam element 120 may be comparable to an area of the view pixel 106'.

In some embodiments, the size of the multibeam element 120 is comparable to the view pixel size such that the multibeam element size is between about fifty percent (50%) and about two hundred percent (200%) of the view pixel size. For example, if the multibeam element size is denoted 's' and the view pixel size is denoted 'S' (e.g., as illustrated in FIG. 3A), then the multibeam element size s may be given by equation (2) as $$\tfrac{1}{2}S \leq s \leq 2S \qquad (2)$$

In other examples, the multibeam element size is greater than about sixty percent (60%) of the view pixel size, or about seventy percent (70%) of the view pixel size, or greater than about eighty percent (80%) of the view pixel size, or greater than about ninety percent (90%) of the view pixel size, and the multibeam element is less than about one hundred eighty percent (180%) of the view pixel size, or less than about one hundred sixty percent (160%) of the view pixel size, or less than about one hundred forty percent (140%) of the view pixel size, or less than about one hundred twenty percent (120%) of the view pixel size. For example, by 'comparable size', the multibeam element size may be between about seventy-five percent (75%) and about one hundred fifty (150%) of the view pixel size. In another example, the multibeam element 120 may be comparable in size to the view pixel 106' where the multibeam element size is between about one hundred twenty-five percent (125%) and about eighty-five percent (85%) of the view pixel size. According to some embodiments, the comparable sizes of the multibeam element 120 and the view pixel 106' may be chosen to reduce, or in some examples to minimize, dark zones between views of the multiview display, while at the same time reducing, or in some examples minimizing, an overlap between views of the multiview display.

As illustrated in FIGS. 3A-3D, the transparent multiview display 100 further comprises an array of light valves 130. The array of light valves 130 is configured to modulate the directional light beams 102 of the directional light beam plurality. In particular, the light valve array may be configured to modulate the directional light beams 102 as or to provide an image being displayed by the transparent multiview display 100, such as the multiview image. In FIG. 3C, the array of light valves 130 is partially cut-away to allow visualization of the light guide 110 and the multibeam element 120 underlying the light valve array.

Further, different ones of the directional light beams 102 having different principal angular directions are configured to pass through and thus be modulated by different ones of the light valves 130 in the light valve array. Further, as illustrated, a light valve 130 of the array corresponds to a view pixel 106', while a set of the light valves 130 of the light valve array corresponds to a multiview pixel 106 of the transparent multiview display 100. In particular, a different set of light valves 130 of the light valve array is configured to receive and modulate the directional light beams 102 from different ones of the multibeam elements 120. Thus, as illustrated, there is one unique set of light valves 130 for each multibeam element 120. In various embodiments, any of a variety of different types of light valves may be employed as the light valves 130 of the light valve array including, but not limited to, one or more of liquid crystal light valves, electrophoretic light valves, and light valves based on or employing electrowetting.

FIG. 3A illustrates a first light valve set 130a configured to receive and modulate the directional light beams 102 from a first multibeam element 120a, while a second light valve set 130b is configured to receive and modulate the directional light beams 102 from a second multibeam element 120b, as illustrated. Thus, each of the light valve sets (e.g., the first and second light valve sets 130a, 130b) in the light valve array corresponds, respectively, to a different multiview pixel 106, with individual light valves 130 of the light valve sets corresponding to the view pixels 106' of the respective multiview pixels 106, as illustrated in FIG. 3A.

Note that, in FIG. 3A, the size of a view pixel 106' may correspond to an actual size of a light valve 130 in the light valve array. In other examples, the view pixel size or equivalently the light valve size may be defined as a distance (e.g., a center-to-center distance) between adjacent light valves 130 of the light valve array. For example, the light valves 130 may be smaller than the center-to-center distance between the light valves 130 in the light valve array. The view pixel or light valve size may be defined as either the size of the light valve 130 or a size corresponding to the center-to-center distance between the light valves 130, for example.

In some embodiments, a relationship between the multibeam elements 120 of the plurality and corresponding multiview pixels 106 (e.g., sets of light valves 130) may be a one-to-one relationship. That is, there may be an equal number of multiview pixels 106 and multibeam elements 120. FIG. 3B explicitly illustrates by way of example the one-to-one relationship where each multiview pixel 106 comprising a different set of light valves 130 is illustrated as surrounded by a dashed line. In other embodiments (not illustrated), the number of multiview pixels 106 and multibeam elements 120 may differ from one another.

In some embodiments, an inter-element distance (e.g., center-to-center distance) between a pair of adjacent multibeam elements 120 of the plurality may be equal to an inter-pixel distance (e.g., a center-to-center distance) between a corresponding adjacent pair of multiview pixels 106, e.g., represented by light valve sets. For example, in FIG. 3A, a center-to-center distance d between the first multibeam element 120a and the second multibeam element 120b is substantially equal to a center-to-center distance D between the first light valve set 130a and the second light valve set 130b, as illustrated. In other embodiments (not illustrated), the relative center-to-center distances of pairs of multibeam elements 120 and corresponding light valve sets may differ, e.g., the multibeam elements 120 may have an inter-element spacing (i.e., center-to-center distance d) that is one of greater than or less than a spacing (i.e., center-to-center distance D) between light valve sets representing multiview pixels 106.

In some embodiments, a shape of the multibeam element 120 may be analogous to a shape of the multiview pixel 106 or equivalently, a shape of a set (or 'sub-array') of the light valves 130 corresponding to the multiview pixel 106. For example, the multibeam element 120 may have a square shape and the multiview pixel 106 (or an arrangement of a corresponding set of light valves 130) may be substantially square. In another example, the multibeam element 120 may have a rectangular shape, i.e., may have a length or longitudinal dimension that is greater than a width or transverse dimension. In this example, the multiview pixel 106 (or equivalently the arrangement of the set of light valves 130) corresponding to the multibeam element 120 may have an analogous rectangular shape. FIG. 3B illustrates a top or plan view of square-shaped multibeam elements 120 and corresponding square-shaped multiview pixels 106 comprising square sets of light valves 130. In yet other examples (not illustrated), the multibeam elements 120 and the corresponding multiview pixels 106 have various shapes including or at least approximated by, but not limited to, a triangular shape, a hexagonal shape, and a circular shape.

Further (e.g., as illustrated in FIG. 3A), each multibeam element 120 is configured to provide directional light beams 102 to one and only one multiview pixel 106, according to some embodiments. In particular, for a given one of the multibeam elements 120, the directional light beams 102 having different principal angular directions corresponding to the different views of the multiview display are substantially confined to a single corresponding multiview pixel 106 and the view pixels 106' thereof, i.e., a single set of light valves 130 corresponding to the multibeam element 120 (e.g., as illustrated in FIG. 3A). As such, each multibeam element 120 of the transparent multiview display 100 provides a corresponding set of directional light beams 102 that has a set of the different principal angular directions corresponding to the different views of the multiview display (i.e., the set of directional light beams 102 contains a light beam having a direction corresponding to each of the different view directions).

According to various embodiments, the multibeam elements 120 may comprise any of a number of different structures configured to couple out a portion of the guided light 104. For example, the different structures may include, but are not limited to, diffraction gratings, micro-reflective elements, micro-refractive elements, or various combinations thereof. In some embodiments, the multibeam element 120 comprising a diffraction grating is configured to diffractively couple out the guided light portion as the plurality of directional light beams 102 having the different principal angular directions. In other embodiments, the multibeam element 120 comprising a micro-reflective element is configured to reflectively couple out the guided light portion as the plurality of directional light beams 102, or the multibeam element 120 comprising a micro-refractive element is configured to couple out the guided light portion as the plurality of directional light beams 102 by or using refraction (i.e., refractively couple out the guided light portion).

Figure 4A:
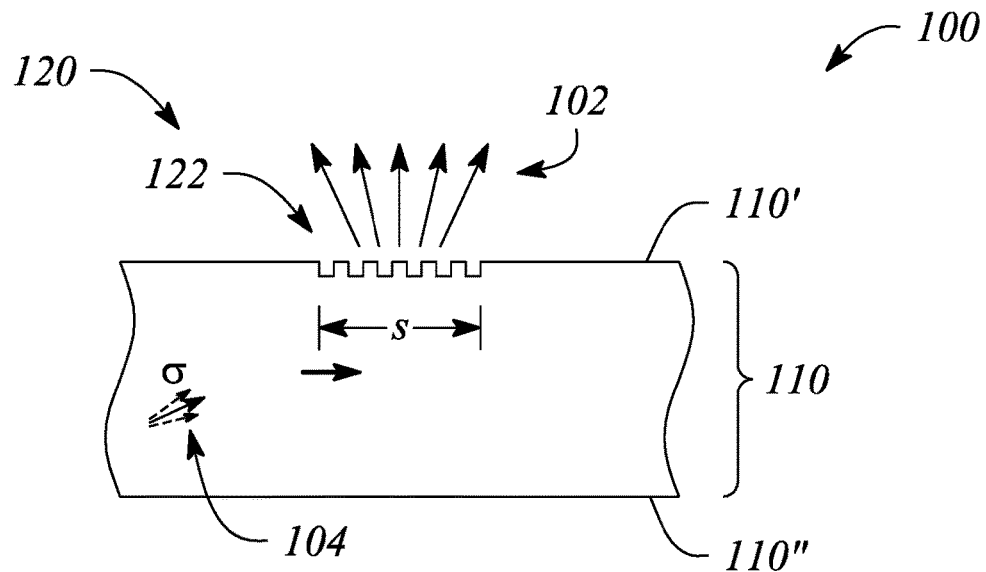
FIG. 4A illustrates a cross sectional view of a portion of a transparent multiview display including a multibeam element in an example, according to an embodiment consistent with the principles described herein.
Figure 4B:
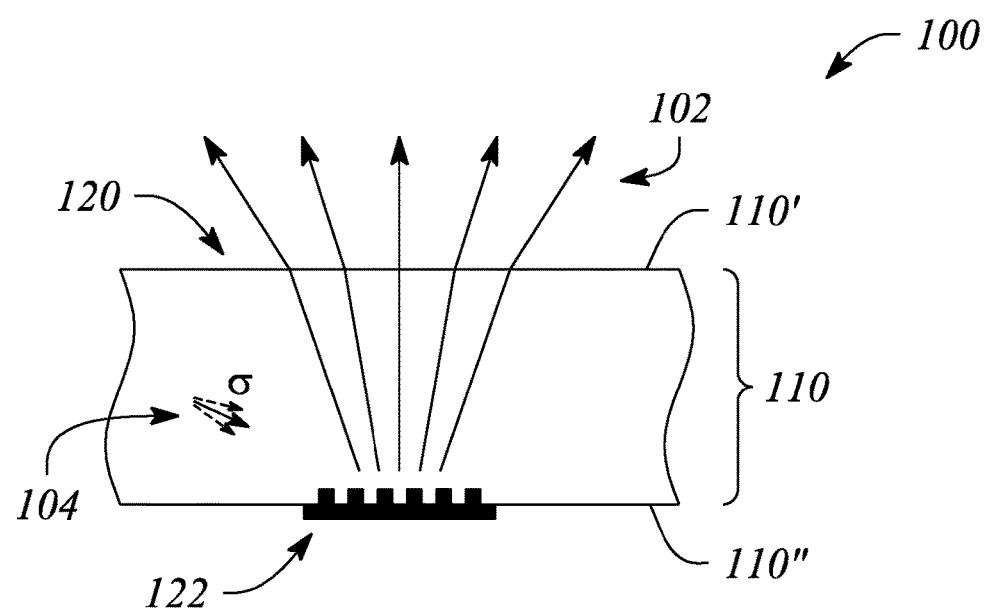
FIG. 4B illustrates a cross sectional view of a portion of a transparent multiview display including a multibeam element in an example, according to another embodiment consistent with the principles described herein.

FIG. 4A illustrates a cross sectional view of a portion of a transparent multiview display 100 including a multibeam element 120 in an example, according to an embodiment consistent with the principles described herein. FIG. 4B illustrates a cross sectional view of a portion of a transparent multiview display 100 including a multibeam element 120 in an example, according to another embodiment consistent with the principles described herein. In particular, FIGS. 4A-4B illustrate the multibeam element 120 of the transparent multiview display 100 comprising a diffraction grating 122. The diffraction grating 122 is configured to diffractively couple out a portion of the guided light 104 as the plurality of directional light beams 102. The diffraction grating 122 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 122 may be sub-wavelength (i.e., less than a wavelength of the guided light).

In some embodiments, the diffraction grating 122 of the multibeam element 120 may be located at or adjacent to a surface of the light guide 110. For example, the diffraction grating 122 may be at or adjacent to the first surface 110' of the light guide 110, as illustrated in FIG. 4A. The diffraction grating 122 at light guide first surface 110' may be a transmission mode diffraction grating configured to diffractively couple out the guided light portion through the first surface 110' as the directional light beams 102. In another example, as illustrated in FIG. 4B, the diffraction grating 122 may be located at or adjacent to the second surface 110" of the light guide 110. When located at the second surface 110", the diffraction grating 122 may be a reflection mode diffraction grating. As a reflection mode diffraction grating, the diffraction grating 122 is configured to both diffract the guided light portion and reflect the diffracted guided light portion toward the first surface 110' to exit through the first surface 110' as the diffractively directional light beams 102. In other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the directional light beams 102 may include an effect of refraction due to the directional light beams 102 exiting the light guide 110 at a light guide surface. For example, FIG. 4B illustrates refraction (i.e., bending) of the directional light beams 102 due to a change in refractive index as the directional light beams 102 cross the first surface 110', by way of example and not limitation. Also see FIGS. 7A and 7B, described below.

According to some embodiments, the diffractive features of the diffraction grating 122 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

In some embodiments, the diffraction grating 122 of the multibeam element 120 is a uniform diffraction grating in which the diffractive feature spacing is substantially constant or unvarying throughout the diffraction grating 122. In other embodiments, the diffraction grating 122 may be a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a 'chirp' of or change in the diffractive feature spacing that varies linearly with distance. As such, the chirped diffraction grating is a 'linearly chirped' diffraction grating, by definition. In other embodiments, the chirped diffraction grating of the multibeam element 120 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 5A:
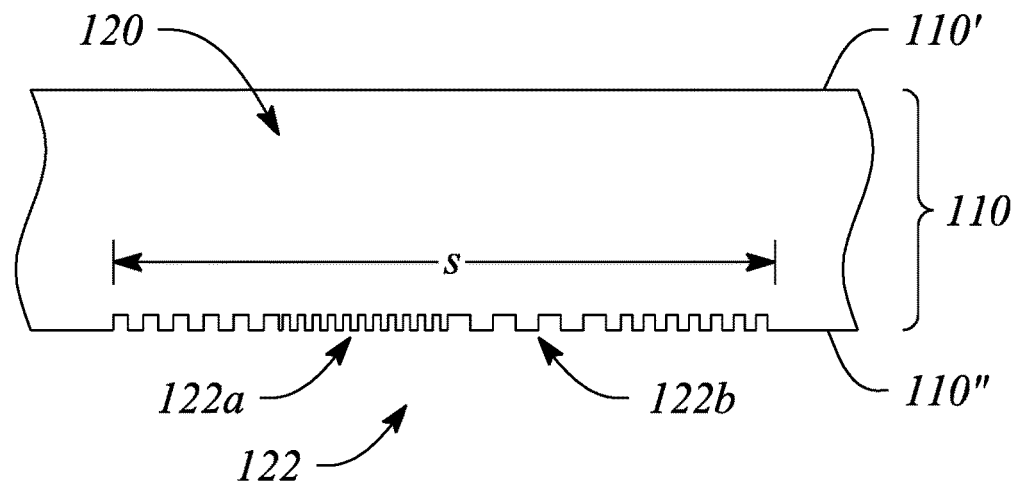
FIG. 5A illustrates a cross sectional view of a diffraction grating comprising a plurality of sub-gratings in an example, according to an embodiment consistent with the principles described herein.
Figure 5B:
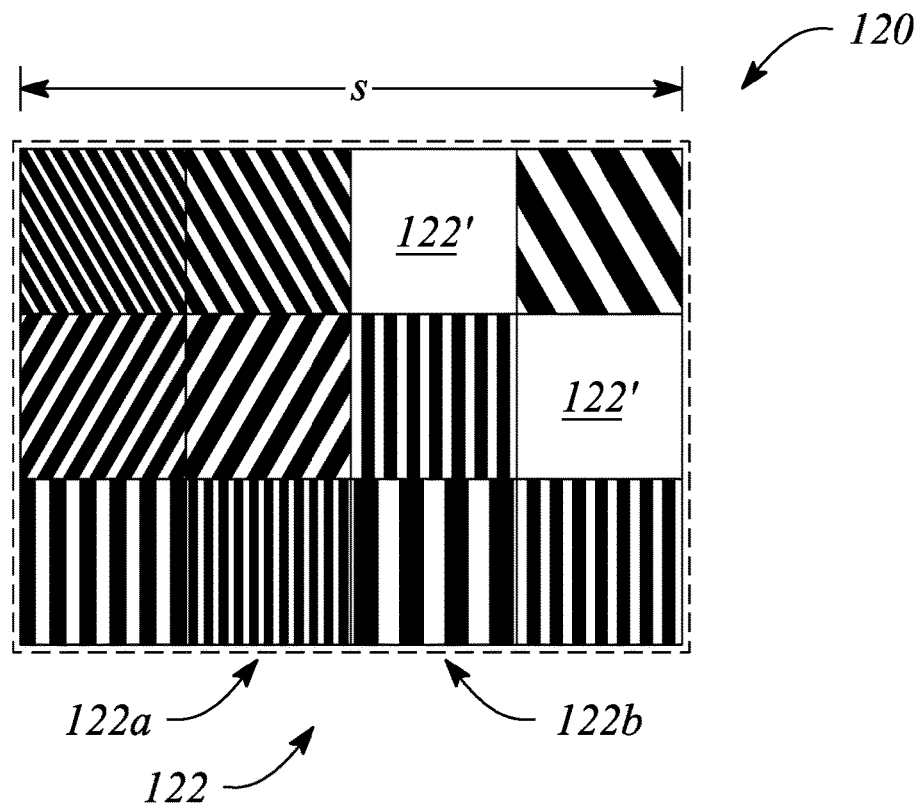
FIG. 5B illustrates a plan view of the diffraction grating illustrated in FIG. 5A in an example, according to an embodiment consistent with the principles described herein.

In some embodiments, the diffraction grating 122 may comprise a plurality of diffraction gratings or equivalently a plurality of sub-gratings. FIG. 5A illustrates a cross sectional view of a diffraction grating 122 comprising a plurality of sub-gratings in an example, according to an embodiment consistent with the principles described herein. FIG. 5B illustrates a plan view of the diffraction grating 122 illustrated in FIG. 5A in an example, according to an embodiment consistent with the principles described herein. The cross sectional view in FIG. 5A may represent a cross section taken from left to right through a bottom row of sub-gratings of the diffraction grating 122 illustrated in FIG. 5B, for example. As illustrated in FIGS. 5A and 5B, the plurality of sub-gratings comprises a first sub-grating 122*a* and a second sub-grating 122*b* within the diffraction grating 122 of the multibeam element 120 on a surface (e.g., a second surface 110", as illustrated) of the light guide 110. A size s of the multibeam element 120 is illustrated in both FIGS. 5A and 5B, while a boundary of the multibeam element 120 is illustrated in FIG. 5B using a dashed line.

According to some embodiments, a differential density of sub-gratings within the diffraction grating 122 between different multibeam elements 120 of the multibeam element plurality may be configured to control a relative intensity of the plurality of directional light beams 102 diffractively scattered out by respective different multibeam elements 120. In other words, the multibeam elements 120 may have different densities of diffraction gratings 122 therein and the different densities (i.e., the differential density of the sub-gratings) may be configured to control the relative intensity of the plurality of directional light beams 102. In particular, a multibeam element 120 having fewer sub-gratings within the diffraction grating 122 may produce a plurality of directional light beams 102 having a lower intensity (or beam density) than another multibeam element 120 having relatively more sub-gratings. The differential density of sub-gratings may be provided using locations such as location 122' illustrated in FIG. 5B within the multibeam element 120 that lack or are without a sub-grating, for example.

Figure 6:
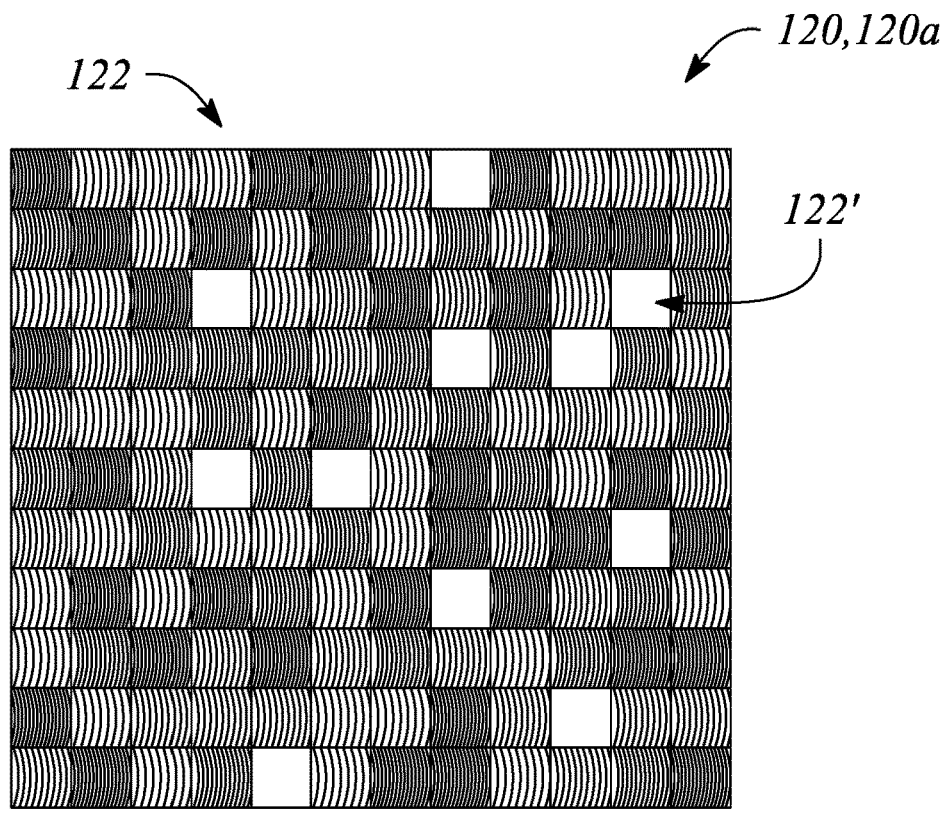
FIG. 6 illustrates a plan view of a pair of multibeam elements in an example, according to an embodiment consistent with the principles described herein.
Figure 6:
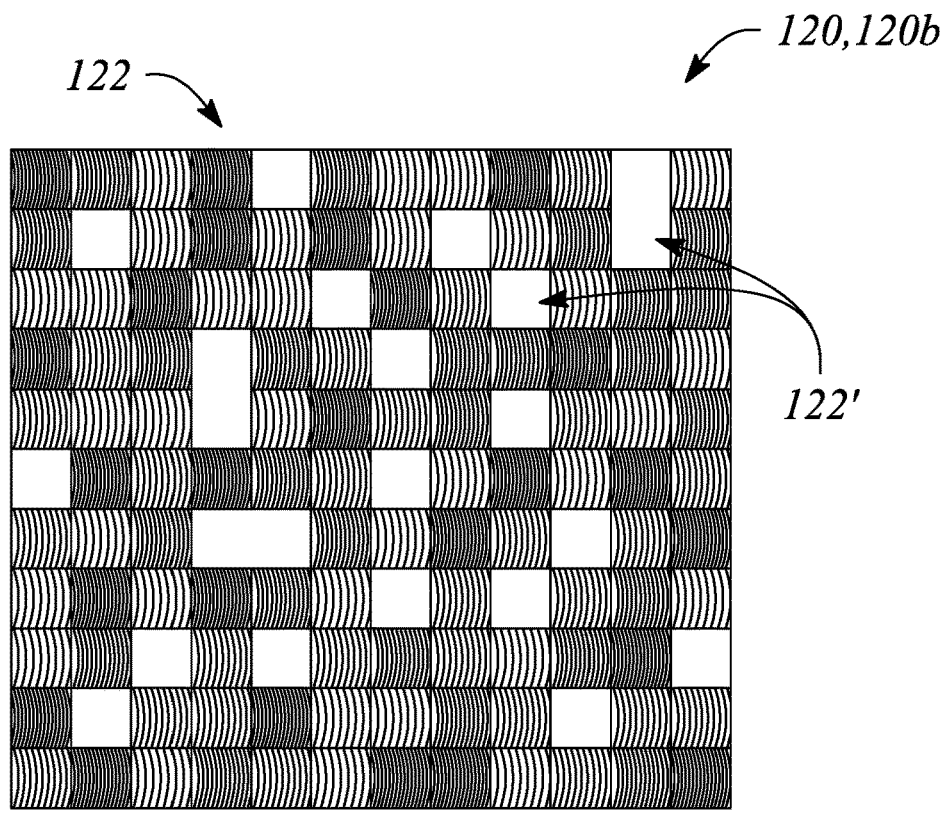

FIG. 6 illustrates a plan view of a pair of multibeam elements 120 in an example, according to an embodiment consistent with the principles described herein. As illustrated, a first multibeam element 120a of the pair has a higher density of sub-gratings within the diffraction grating 122 than are present in a second multibeam element 120b of the pair. In particular, the second multibeam element 120b has a diffraction grating 122 with fewer sub-gratings and more locations 122' without a sub-grating than the first multibeam element 120a. In some embodiments, the higher density of sub-gratings in the first multibeam element 120a may provide a plurality of directional light beams having a higher intensity than the intensity of the plurality of directional light beams provided by the second multibeam element 120b. The higher and lower intensities of the respective directional light beam pluralities provided by the differential sub-grating densities illustrated in FIG. 6 may be used to compensate for a change in optical intensity of the guided light within the light guide as a function of propagation distance, according to some embodiments. By way of example and not limitation, FIG. 6 also illustrates diffraction gratings 122 with sub-gratings having curved diffractive features.

Figure 7A:
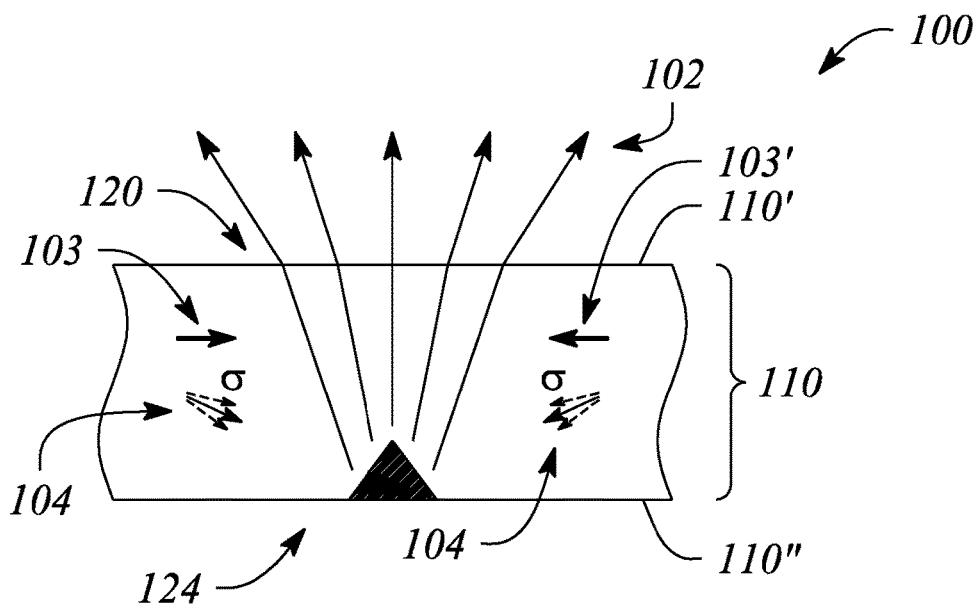
FIG. 7A illustrates a cross sectional view of a portion of a transparent multiview display including a multibeam element in an example, according to another embodiment consistent with the principles described herein.
Figure 7B:
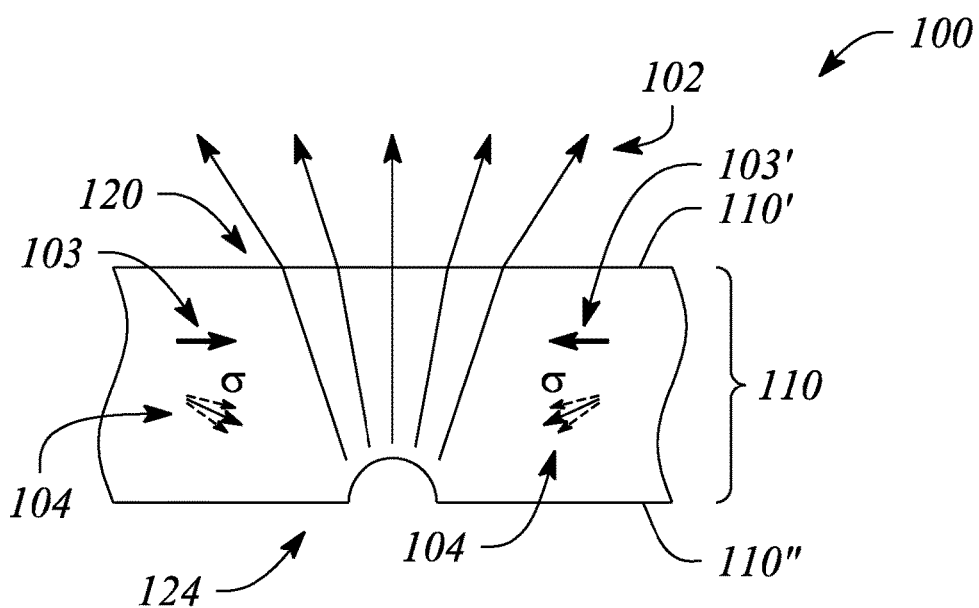
FIG. 7B illustrates a cross sectional view of a portion of a transparent multiview display including a multibeam element in an example, according to another embodiment consistent with the principles described herein.

FIG. 7A illustrates a cross sectional view of a portion of a transparent multiview display 100 including a multibeam element 120 in an example, according to another embodiment consistent with the principles described herein. FIG. 7B illustrates a cross sectional view of a portion of a transparent multiview display 100 including a multibeam element 120 in an example, according to another embodiment consistent with the principles described herein. In particular, FIGS. 7A and 7B illustrate various embodiments of the multibeam element 120 comprising a micro-reflective element. Micro-reflective elements used as or in the multibeam element 120 may include, but are not limited to, a reflector that employs a reflective material or layer thereof (e.g., a reflective metal) or a reflector based on total internal reflection (TIR). According to some embodiments (e.g., as illustrated in FIGS. 7A-7B), the multibeam element 120 comprising the micro-reflective element may be located at or adjacent to a surface (e.g., the second surface 110") of the light guide 110. In other embodiments (not illustrated), the micro-reflective element may be located within the light guide 110 between the first and second surfaces 110', 110".

For example, FIG. 7A illustrates the multibeam element 120 comprising a micro-reflective element 124 having reflective facets (e.g., a 'prismatic' micro-reflective element) located adjacent to the second surface 110" of the light guide 110. The facets of the illustrated prismatic micro-reflective element 124 are configured to reflect (i.e., reflectively scatter) the portion of the guided light 104 out of the light guide 110 as directional light beams 102. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 7A) or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 7B illustrates the multibeam element 120 comprising a micro-reflective element 124 having a substantially smooth, curved surface such as, but not limited to, a semi-spherical micro-reflective element 124. A specific surface curve of the micro-reflective element 124 may be configured to reflect the guided light portion in different directions depending on a point of incidence on the curved surface with which the guided light 104 makes contact, for example. As illustrated in FIGS. 7A and 7B, the guided light portion that is reflectively scattered out of the light guide 110 exits or is emitted from the first surface 110', by way of example and not limitation. As with the prismatic micro-reflective element 124 in FIG. 7A, the micro-reflective element 124 in FIG. 7B may be either a reflective material within the light guide 110 or a cavity (e.g., a semi-circular cavity) formed in the second surface 110", as illustrated in FIG. 7B by way of example and not limitation. FIGS. 7A and 7B also illustrate the guided light 104 having two propagation directions 103, 103' (i.e., illustrated as bold arrows), by way of example and not limitation. Using two propagation directions 103, 103' may facilitate providing the plurality of directional light beams 102 with symmetrical principal angular directions, for example.

Figure 8:
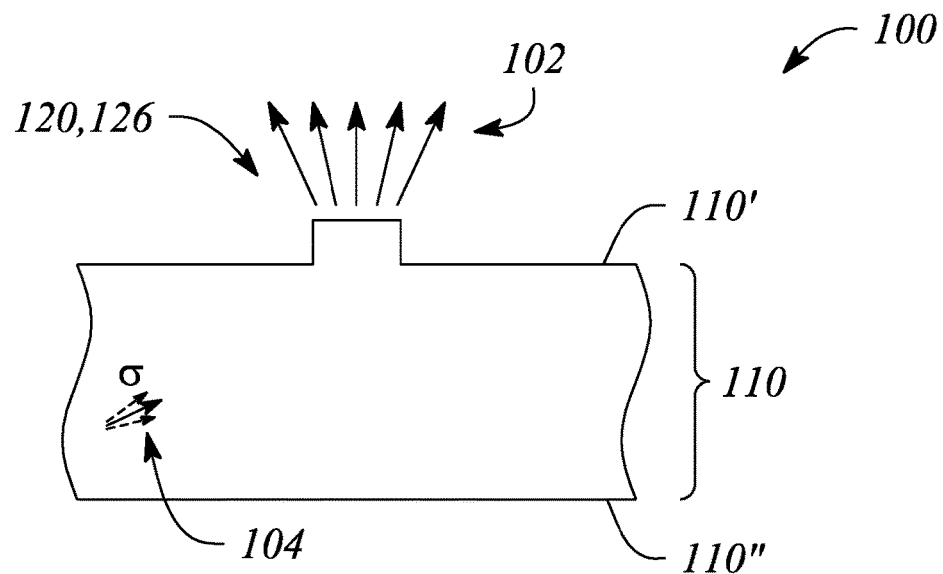
FIG. 8 illustrates a cross sectional view of a portion of a transparent multiview display including a multibeam element in an example, according to another embodiment consistent with the principles described herein.

FIG. 8 illustrates a cross sectional view of a portion of a transparent multiview display 100 including a multibeam element 120 in an example, according to another embodiment consistent with the principles described herein. In particular, FIG. 8 illustrates a multibeam element 120 comprising a micro-refractive element 126. According to various embodiments, the micro-refractive element 126 is configured to refractively couple or scatter out a portion of the guided light 104 from the light guide 110. That is, the micro-refractive element 126 is configured to employ refraction (e.g., as opposed to diffraction or reflection) to couple or scatter out the guided light portion from the light guide 110 as the directional light beams 102, as illustrated in FIG. 8. The micro-refractive element 126 may have various shapes including, but not limited to, a semi-spherical shape, a rectangular shape or a prismatic shape (i.e., a shape having sloped facets). According to various embodiments, the micro-refractive element 126 may extend or protrude out of a surface (e.g., the first surface 110') of the light guide 110, as illustrated, or may be a cavity in the surface (not illustrated). Further, the micro-refractive element 126 may comprise a material of the light guide 110, in some embodiments. In other embodiments, the micro-refractive element 126 may comprise another material adjacent to, and in some examples, in contact with the light guide surface.

Referring again to FIG. 3A, the transparent multiview display 100 may further comprise a light source 140. According to various embodiments, the light source 140 is configured to provide the light to be guided within light guide 110. In particular, the light source 140 may be located adjacent to an entrance surface or end (input end) of the light guide 110. In various embodiments, the light source 140 may comprise substantially any source of light (e.g., optical emitter) including, but not limited to, one or more light emitting diodes (LEDs) or a laser (e.g., laser diode). In some embodiments, the light source 140 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 140 may be a substantially broadband light source configured to provide substantially broadband or polychromatic light. For example, the light source 140 may provide white light. In some embodiments, the light source 140 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 140 may further comprise a collimator (not illustrated). The collimator may be configured to receive substantially uncollimated light from one or more of the optical emitters of the light source 140. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110 to propagate as the guided light 104, described above.

In various embodiments, the transparent multiview display 100 is configured to be substantially transparent to light in a direction through the light guide 110 orthogonal to a propagation direction 103, 103' of the guided light 104. In particular, the light guide 110 and the spaced apart plurality of multibeam elements 120 allow light to pass through the light guide 110 through both the first surface 110' and the second surface 110". Transparency may be facilitated, at least in part, due to both the relatively small size of the multibeam elements 120 and the relative large inter-element spacing (e.g., one-to-one correspondence with multiview pixels 106) of the multibeam element 120. Further, especially when the multibeam elements 120 comprise diffraction gratings, the multibeam elements 120 may also be substantially transparent to light propagating orthogonal to the light guide surfaces 110', 110", in some embodiments. Further, the array of light valves 130 is configured to also be transparent to the orthogonally propagating light, at least in some instances (e.g., when the light valves are set to a clear or a 'white light' state). Thus, for example, light from the background scene 101 may pass in the orthogonal direction through the light guide 110 with the multibeam element plurality and also through at least some of the light valves 130 of the light valve array to facilitate viewing of the background scene 101 through the transparent multiview display 100, according to various embodiments.

In accordance with some embodiments of the principles described herein, a transparent display is provided. The transparent display is configured to emit modulated light as pixels of an image that is displayed on or by the transparent display. Further, the transparent display is configured to enable a background scene to be visible through the transparent display, according to various embodiments.

In some embodiments, the transparent display may be a two-dimensional (2D) transparent display configured to emit modulated light having a relatively broad, but substantially non-directional viewing angle. That is, the 2D transparent display may emit modulated light as pixels of the displayed image, e.g., as a '2D' image. Further, as a 2D image, the displayed image is configured to provide substantially the view of the displayed image to a viewer substantially anywhere within the broad viewing angle. According to various embodiments, the displayed image provided by the transparent display may appear as being superimposed on or in the background scene.

In other embodiments, the transparent display may be a transparent multiview display in which the emitted modulated light comprises emitted modulated directional light beams that are be preferentially directed toward a plurality of viewing directions of the transparent multiview display. With respect to the transparent multiview display embodiments, the displayed image may be a three-dimensional (3D) or multiview image comprising directional pixels having directions corresponding to directions of the modulated directional light beams. In particular, different ones of the emitted modulated directional light beams may correspond to individual directional pixels of different 'views' associated with the multiview image. The different views may provide a 'glasses free' (e.g., autostereoscopic) viewing experience of a representation of information in the multiview image being displayed by the transparent multiview display, for example. Further, the multiview image provided by the transparent multiview display may appear as being superimposed on or in the background scene, according to various embodiments.

Figure 9:
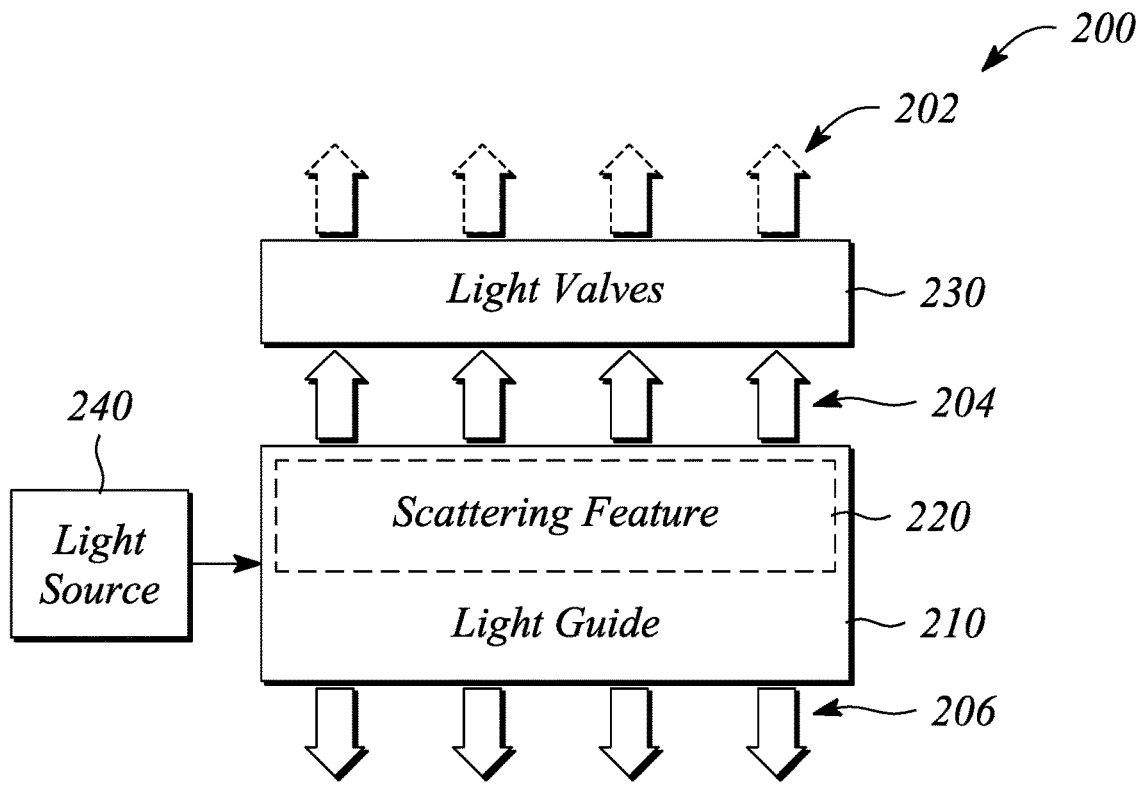
FIG. 9 illustrates a block diagram of a transparent display in an example, according to an embodiment consistent with the principles described herein.

FIG. 9 illustrates a block diagram of a transparent display 200 in an example, according to an embodiment consistent with the principles described herein. According to various embodiments, the transparent display 200 is configured to display an image that appears to a viewer to be superimposed on a background scene 201 (i.e., a scene that is behind or viewed through the transparent display 200). In some embodiments, the displayed image may be a multiview image having different views in different view directions. In particular, modulated emitted light 202 provided by the transparent display 200 corresponds to pixels of the displayed image. In some embodiments, the modulated emitted light 202 from the transparent display 200 may be modulated directional light beams and may correspond to directional pixels of the different views of the displayed multiview image. The modulated emitted light 202 is illustrated as arrows emanating the transparent display 200 in FIG. 9. Dashed lines are used for the arrows of the modulated emitted light 202 to emphasize the modulation thereof, by way of example and not limitation.

The transparent display 200 illustrated in FIG. 9 comprises a light guide 210 having a scattering feature 220. In some embodiments, the scattering feature 220 either is an angle-preserving scattering feature or comprises an angle-preserving scatterer. The light guide is configured to guide light along a length of the light guide 210 as guided light and the scattering feature is configured to scatter a portion of the guided light out of the light guide as emitted light 204. For example, the scattering feature 220 may comprise an angle-preserving scatterer configured to provide angle-preserving scattering according to a collimation factor of the guided light. In some embodiments, the light guide 210 may be substantially similar to the light guide 110, described above with respect to the transparent multiview display 100.

The transparent display 200 illustrated in FIG. 9 further comprises an array of light valves 230. The array of light valves 230 is configured to modulate the emitted light 204 to provide the modulated emitted light 202 representing the display image (i.e., pixels of the displayed image). In some embodiments, the array of light valves 230 may be substantially similar to the array of light valves 130 of the above-described transparent multiview display 100. In particular, a transparency of a combination of the light guide 210 with the scattering feature 220 and the array of light valves 230 is configured to enable a background scene to be visible through the transparent display, according to various embodiments.

As illustrated, the transparent display 200 further comprises a light source 240. The light source 240 is coupled to an edge of the light guide 210. The light source 240 is configured to provide light to be guided as the guided light within the light guide 210. In some embodiments, the light source 240 may be substantially similar to the light source 140 of the transparent multiview display 100, described above. For example, the light source 240 may be configured to provide the guided light one or both of having a non-zero propagation angle and being collimated according to a predetermined collimation factor. The light source 240 may comprise a collimator configured to provide the guided light as collimated guided light having a predetermined collimation factor, for example.

In some embodiments, the array of light valves 230 may be adjacent to a first surface of the light guide 210 opposite to a second surface adjacent to the background scene 201. The scattering feature 220 may be further configured to scatter another portion of the guided light out of the light guide through the second surface. The other portion of the guide light that is scattered out by the scattering feature 220 may be used to illuminate (or serve as an illumination source for) the background scene 201, for example. FIG. 9 illustrates scattered out light 206 provide by the scattering feature 220 from the other portion of the guided light as arrows directed toward the background scene 201.

In some embodiments, the light source 240 may be configured to provide the light having a predetermined polarization. For example, the light source 240 may comprise a polarizer or polarized optical emitters. In these embodiments, the scattering feature 220 may be configured to provide polarization-preserving scattering and the emitted light 204 may have a polarization configured to match an input polarization of the array of light valves 230, for example. In some embodiments, the scattering feature 220 may be both an angle-preserving scattering feature and a polarization-preserving scattering feature.

In some embodiments, the scattering feature 220 may comprise a plurality of multibeam elements spaced apart from one another along a length of the light guide 210. A multibeam element of the plurality of multibeam elements may be configured to scatter out from the light guide a portion of the guided light as a plurality of directional light beams having different principal angular directions from one another. Further, the different principal angular directions of the directional light beams may correspond to respective different view directions of different views of a multiview image. Hence, the displayed image may be the multiview image and the transparent display 200 may be a transparent multiview display, according to some embodiments.

In some embodiments, the multibeam element plurality of the scattering feature 220 may be substantially similar to the plurality of multibeam elements 120 described above with respect to the transparent multiview display 100. For example, a size of the multibeam element of the multibeam element plurality of the scattering feature 220 may be between fifty percent and two hundred percent of a size of a light valve 230 of the array of light valves 230. Further, the multibeam element may comprise one or more of a diffraction grating, a micro-reflective element and a micro-refractive element optically connected to the light guide to scatter out the portion of the guided light, in some embodiments.

For example, the multibeam element may comprise a diffraction grating substantially similar to the diffraction grating 122, described above, e.g., and illustrated in FIGS. 4A-4B, with respect to the multibeam element 120. In another example, the multibeam element may comprise a micro-reflective element that is substantially similar to the micro-reflective element 124, described above, e.g., and illustrated in FIGS. 7A-7B, with respect to the multibeam element 120. In yet another example, the multibeam element may comprise a micro-refractive element. The micro-refractive element may be substantially similar to the micro-refractive element 126 described above, e.g., and illustrated in FIG. 8, with respect to the multibeam element 120.

Figure 10:
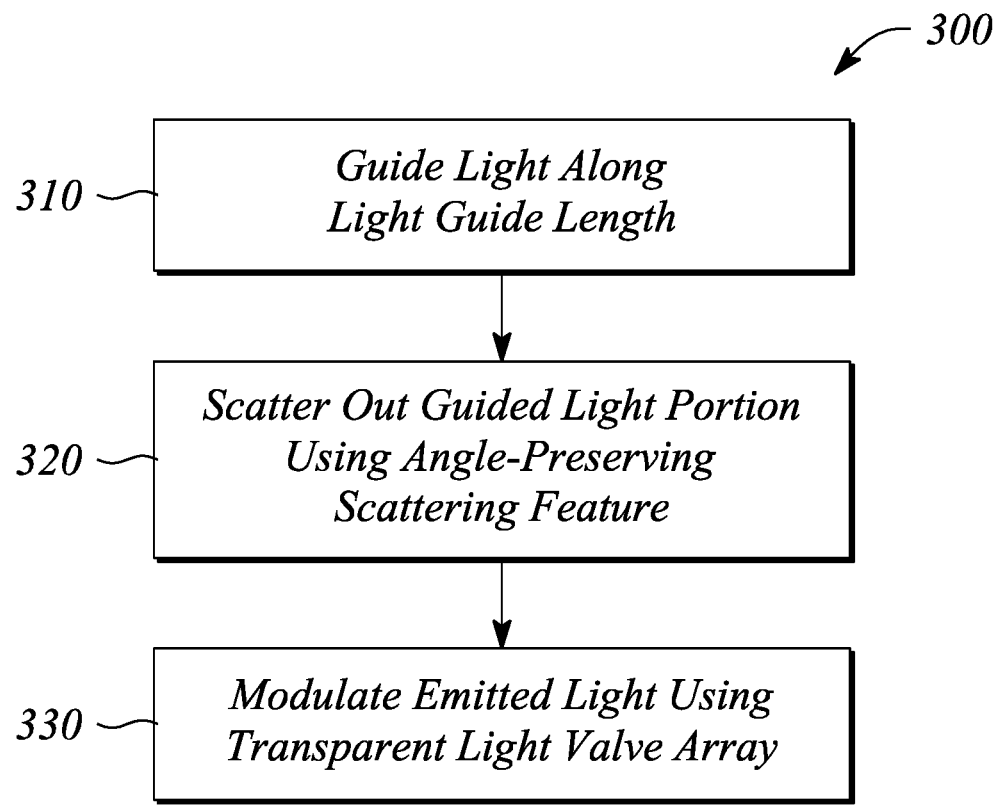
FIG. 10 illustrates a flow chart of a method of transparent display operation in an example, according to an embodiment consistent with the principles described herein.

In accordance with other embodiments of the principles described herein, a method of transparent display operation is provided. FIG. 10 illustrates a flow chart of a method 300 of transparent display operation in an example, according to an embodiment consistent with the principles described herein. As illustrated in FIG. 10, the method 300 of transparent display operation comprises guiding 310 light along a length of a light guide as guided light. In some embodiments, the light may be guided 310 at a non-zero propagation angle. Further, the guided light may be collimated according to a predetermined collimation factor. According to some embodiments, the light guide may be substantially similar to the light guide 110 described above with respect to the transparent multiview display 100.

As illustrated in FIG. 10, the method 300 of transparent display operation further comprises scattering 320 a portion of the guided light out of the light guide as emitted light using a scattering feature of the light guide. In some embodiments, the scattering feature is substantially similar to the scattering feature 220 described above with respect to the transparent display 200. For example, the scattering feature may provide one or both of angle-preserving scattering according to a collimation factor of the guided light and polarization-preserving scattering.

The method 300 of transparent display operation illustrated in FIG. 10 further comprises modulating 330 the emitted light using a transparent array of light valves. The transparent array of light valves is configured to modulate the emitted light as a displayed image. According to various embodiments, a combination of the light guide with the scattering feature and the transparent light valve array of the transparent display enable a background scene to be visible through the transparent display. In some embodiments, the transparent array of light valves may be substantially similar to the array of light valves 130 of the above-described transparent multiview display 100.

In some embodiments, the scattering feature used in scattering 320 comprises a plurality of multibeam elements. Further, the emitted light comprises a plurality of directional light beams having different principal angular directions corresponding to respective different view directions of the multiview image. In some embodiments, the plurality of multibeam elements may be substantially similar to the plurality of multibeam elements 120 of the transparent multiview display 100, described above. For example, the plurality of multibeam elements may comprise one or more of a diffraction grating, a micro-reflective element and a micro-refractive element optically connected to the light guide. Further, the displayed image may be a multiview image and the directional light beam may have directions corresponding to view directions of the multiview image, i.e., the directional light beams, once modulated 330, may represent view pixels of the multiview image. In some embodiments, a size of the multibeam element is comparable to a size of a view pixel or equivalently the size of the light valve of the transparent light valve array. For example, the multibeam element may be greater than one half of the light valve size and less than twice the light valve size.

In some embodiments (not illustrated), the method 300 of transparent display operation further comprises providing light to the light guide using a light source. The provided light may be the guided light that one or both of has a non-zero propagation angle within the light guide and is collimated within the light guide according to a collimation factor to provide a predetermined angular spread of the guided light within the light guide. In some embodiments, the light source may be substantially similar to the light source 140 of the transparent multiview display 100, described above.

In some embodiments (not illustrated), the method 300 of transparent display operation may further comprise scattering another portion of the guided light in a direction to provide illumination to the background scene. In particular, the scattering feature may be configured to scatter light both toward the transparent light valve array and toward the background scene, in some embodiments, as described above.

Thus, there have been described examples and embodiments of a transparent multiview display, a method of transparent multiview display operation, and a transparent display that enable a background scene to be visible through the transparent display. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A transparent multiview display comprising:
   a light guide configured to guide light along a length of the light guide as guided light;
   a plurality of multibeam elements spaced apart from one another along the light guide length, a multibeam element of the plurality of multibeam elements being configured to scatter out a portion of the guided light as a plurality of directional light beams having different principal angular directions corresponding to respective different view directions of a multiview image; and
   an array of light valves configured to modulate the plurality of directional light beams as the multiview image,
   wherein the transparent multiview display is configured to enable a background scene to be visible through the transparent multiview display.

2. The transparent multiview display of claim 1, wherein a size of the multibeam element of the plurality of multibeam elements is between fifty percent and two hundred percent of a size of a light valve of the array of light valves.

3. The transparent multiview display of claim 1, wherein the multibeam element comprises a diffraction grating configured to diffractively scatter out the portion of the guided light as the plurality of directional light beams.

4. The transparent multiview display of claim 3, wherein the diffraction grating comprises a plurality of sub-gratings.

5. The transparent multiview display of claim 1, wherein the multibeam element comprises one or both of a micro-reflective element and a micro-refractive element, the micro-reflective element being configured to reflectively scatter out a portion of the guided light, the micro-refractive element being configured to refractively scatter out a portion of the guided light.

6. The transparent multiview display of claim 1, wherein the multibeam element is located one of at a first surface and at a second surface of the light guide, the multibeam element being configured to scatter out the guided light portion through the first surface.

7. The transparent multiview display of claim 1, further comprising a light source optically coupled to an input of the light guide, the light source being configured to provide the guided light, the guided light being one or both of propagated at a non-zero propagation angle and collimated according to a predetermined collimation factor.

8. The transparent multiview display of claim 1, wherein the plurality of multibeam elements is further configured to emit light in a direction of the background scene, the emitted light being configured to illuminate the background scene.

9. The transparent multiview display of claim 1, wherein the array of light valves comprises a liquid crystal light valve.

10. A transparent display comprising:
    a light guide having a scattering feature comprising a plurality of multibeam elements spaced apart from one another along a length of the light guide, the light guide being configured to guide light along the light guide as guided light and the plurality of multibeam elements of the scattering feature being configured to scatter a portion of the guided light out of the light guide as emitted light comprising a plurality of directional light beams having different principal angular directions corresponding to respective different view directions of different views of a multiview image;
    an array of light valves configured to modulate the emitted light to provide modulated emitted light representing a displayed image; and
    a light source optically coupled to an edge of the light guide and configured to provide light to be guided as the guided light,
    wherein a transparency of a combination of the light guide and the array of light valves is configured to enable a background scene to be visible through the transparent display, the displayed image being the multiview image and the transparent display being a transparent multiview display.

11. The transparent display of claim 10, wherein the array of light valves is adjacent to a first surface of the light guide opposite to a second surface adjacent to the background scene, the scattering feature being configured to scatter another portion of the guided light out of the light guide through the second surface to illuminate the background scene.

12. The transparent display of claim 10, wherein the light source is configured to provide the light having a predetermined polarization, the scattering feature being configured to provide polarization-preserving scattering and the emitted light having a polarization configured to match an input polarization of the array of light valves.

13. The transparent display of claim 10, wherein the light source further comprises a collimator configured to provide the guided light as collimated guided light having a predetermined collimation factor, the scattering feature comprising an angle-preserving scatterer configured to provide angle-preserving scattering according to the collimation factor.

14. The transparent display of claim 10, wherein a size of the multibeam element is between fifty percent and two hundred percent of a size of a light valve of the array of light valves.

15. The multiview display of claim 10, wherein the multibeam element comprises one or more of a diffraction grating, a micro-reflective element and a micro-refractive element optically connected to the light guide to scatter out the portion of the guided light.

16. A method of transparent display operation, the method comprising:
  guiding light along a length of a light guide as guided light;
  scattering a portion of the guided light out of the light guide as emitted light using a scattering feature of the light guide, the scattering feature comprising plurality of multibeam elements spaced apart from one another along the light guide length and the emitted light comprising a plurality of directional light beams having different principal angular directions corresponding to respective different view directions of a multiview image; and
  modulating the emitted light using a transparent array of light valves configured to modulate the emitted light as the multiview image,
  wherein a combination of the light guide with the scattering feature and the transparent light valve array of the transparent display enables a background scene to be visible through the transparent display, the transparent display being a transparent multiview display.

17. The method of transparent display operation of claim 16, wherein the plurality of multibeam elements comprises one or more of a diffraction grating, a micro-reflective element and a micro-refractive element optically connected to the light guide.

18. The method of transparent display of claim 17, further comprising providing light to the light guide using a light source, the provided light being the guided light that is one or both of propagated at a non-zero propagation angle within the light guide and collimated according to a collimation factor to provide a predetermined angular spread of the guided light.

19. The method of transparent display operation of claim 17, further comprising scattering another portion of the guided light in a direction to provide illumination to the background scene.

\* \* \* \* \*